(12) United States Patent
van de Rovaart et al.

(10) Patent No.: US 10,479,325 B2
(45) Date of Patent: Nov. 19, 2019

(54) FASTENING ARRANGEMENT FOR A WIPER BEARING OF A WINDSCREEN WIPER SYSTEM OF A VEHICLE

(71) Applicant: Robert Bosch GmbH, Stuttgart (DE)

(72) Inventors: Robert-Jan van de Rovaart, Ottersweier (DE); Branislav Milenkovic, Belgrad (RS); Eugen Lind, Renchen-Erlach (DE); Oliver Enzmann, Buehlertal (DE); Swen Koehn, Eggenstein (DE); Tino Boos, Baden-Baden (DE); Ulrich Metz, Achern (DE)

(73) Assignee: Robert Bosch GmbH, Stuttgart (DE)

( * ) Notice: Subject to any disclaimer, the term of this patent is extended or adjusted under 35 U.S.C. 154(b) by 283 days.

(21) Appl. No.: 15/532,567

(22) PCT Filed: Nov. 18, 2015

(86) PCT No.: PCT/EP2015/076969
§ 371 (c)(1),
(2) Date: Jun. 2, 2017

(87) PCT Pub. No.: WO2016/087205
PCT Pub. Date: Jun. 9, 2016

(65) Prior Publication Data
US 2017/0334398 A1    Nov. 23, 2017

(30) Foreign Application Priority Data

Dec. 4, 2014  (DE) .......................... 10 2014 224 886

(51) Int. Cl.
*B60S 1/34*   (2006.01)
*B60S 1/04*   (2006.01)

(52) U.S. Cl.
CPC ........... *B60S 1/3493* (2013.01); *B60S 1/0433* (2013.01); *B60S 1/0441* (2013.01); *B60S 1/0447* (2013.01); *B60S 1/349* (2013.01)

(58) Field of Classification Search
CPC ...... B60S 1/043; B60S 1/0433; B60S 1/0436; B60S 1/0438; B60S 1/0441; B60S 1/0447; B60S 1/349; Y10T 403/591
(Continued)

(56) References Cited

U.S. PATENT DOCUMENTS

| | | | | |
|---|---|---|---|---|
| 3,856,193 A | * | 12/1974 | Bott .................. | B60J 1/2008 224/316 |
| 4,509,878 A | * | 4/1985 | Bryson ............... | B60S 1/0436 15/250.27 |
| 6,027,157 A | * | 2/2000 | Epple .................. | B60S 1/0436 15/250.31 |

FOREIGN PATENT DOCUMENTS

| | | |
|---|---|---|
| CN | 1942350 A | 4/2007 |
| DE | 19817289 A1 | 10/1999 |

(Continued)

OTHER PUBLICATIONS

Machine translation of description portion of German publication 102010007896, published Aug. 2011. (Year: 2011).*

(Continued)

*Primary Examiner* — Gary K. Graham
(74) *Attorney, Agent, or Firm* — Michael Best & Friedrich LLP (57) ABSTRACT

The invention relates to a fastening arrangement (10) comprising a wiper bearing (11) of a windscreen wiper arrangement of a vehicle. Said wiper bearing (11) comprises a bearing element (13) having a planar first side (28); a bearing section which protrudes from the first side (28) of the bearing element (13) for guiding a wiper shaft (12); one or more gripping elements (19a, 19b) which are arranged on (Continued)

the bearing section (13a) and respectively comprising a gripping surface which is arranged parallel to the surface of the first side (28) of the bearing element (13).

14 Claims, 6 Drawing Sheets

(58) Field of Classification Search
USPC .................................. 296/96.15, 96.17, 192
See application file for complete search history.

(56) References Cited

FOREIGN PATENT DOCUMENTS

| | | |
|---|---|---|
| DE | 102006059079 | 6/2008 |
| DE | 102010007896 A1 | 8/2011 |
| DE | 102012200800 | 7/2013 |
| EP | 2307245 A1 | 4/2011 |
| FR | 2718799 A1 | 10/1995 |
| FR | 2775456 | 9/1999 |
| FR | 2964617 | 3/2012 |
| JP | S6124525 U | 2/1986 |
| JP | S6215609 U | 1/1987 |
| JP | H0618706 U | 3/1994 |
| JP | 2000087950 A | 3/2000 |
| WO | 03051690 A1 | 6/2003 |
| WO | 2005073039 | 8/2005 |

OTHER PUBLICATIONS

International Search Report for Application No. PCT/EP2015/076969 dated Feb. 22, 2016 (English Translation, 3 pages).

\* cited by examiner

FASTENING ARRANGEMENT FOR A WIPER BEARING OF A WINDSCREEN WIPER SYSTEM OF A VEHICLE

BACKGROUND OF THE INVENTION

The present invention relates to a fastening arrangement for a wiper bearing of a windscreen wiper system for a vehicle, said wiper bearing being rotatably arranged about a wiper shaft.

Wiper systems are generally mounted on a mounting plate of a vehicle body, a wiper motor on the one hand and a wiper bearing on the other hand being connected together thereby. For fastening to the vehicle body generally a plurality of screw connections are used in order to ensure a reliable absorption of the reaction forces and a positionally stable connection of the wiper system, for example, to a vehicle body. For mounting a conventional wiper system generally three screws are used for each wiper bearing; thus, for the mounting, six screws are required in two wiper bearings. Apart from the fact that screws are precision parts and thus relatively expensive compared to other types of fastening, they have to be positioned and tightened either manually or mechanically which represents an additional expenditure of time.

SUMMARY OF THE INVENTION

The object of the present invention is to provide a fastening arrangement for a wiper bearing of a windscreen wiper system which is able to be of simple construction and fastened in a reliable manner and with low mounting effort by using as few tools as possible. In this case, the fastening arrangement is intended to be designed such that a durable mechanical connection is ensured which additionally is simple to install and, by including all material and mounting costs, provides a cost advantage relative to conventional fastening arrangements.

According to a first feature, a fastening arrangement comprising a wiper bearing for a windscreen wiper system of a vehicle is provided, wherein the wiper bearing comprises:
- a bearing element having a planar first side;
- a bearing section which protrudes vertically from the first side of the bearing element for guiding a wiper shaft;
- one or more gripping means which are arranged on the bearing section and respectively comprise a gripping surface which is arranged parallel to the surface of the first side of the bearing element.

The one or more gripping means may also be spaced apart relative to the first side of the bearing element.

It may be provided that the gripping means are spaced apart relative to the first side of the bearing element.

According to one embodiment, a sheet metal body which has a through-recess with a contour may be provided, so that the one or more gripping means may be passed through and by rotating the gripping means the sheet metal body is retained between the one or more gripping means and the bearing element.

Moreover, the one or more gripping means may have a spacing relative to the first side of the bearing element which substantially corresponds to the material thickness of the sheet metal body.

It may be provided that an engagement means is provided, said engagement means being received in a guide recess when passing the one or more gripping means through the through-recess.

According to one embodiment, the guide recess may be configured with a stop for the engagement means, such that after rotating the bearing section by a predetermined angle, in particular by 90°, further rotation is blocked.

Moreover, the guide recess may be configured with an engagement groove so that after rotating the bearing section by the predetermined angle an engagement means is latched into the engagement groove and, as a result, the bearing section is blocked from rotating back.

It may be provided that the guide recess comprises an arcuate groove, the radius thereof corresponding to the spacing between the engagement means and the wiper shaft.

The wiper bearing may be provided with a fastening lever, the wiper bearing being able to be brought thereby from its mounted position into its final position.

A retaining element may be arranged on the bearing element or on the fastening lever, the wiper bearing being able to be secured thereby to an articulated rod which is connected, in particular, to a drive unit for driving the wiper shaft.

According to a further feature, a windscreen wiper system is provided for a vehicle, preferably a motor vehicle, comprising a wiper bearing which is rotatably arranged about a wiper shaft, wherein the wiper bearing comprises the above fastening arrangement.

According to a further feature, a fastening arrangement for a wiper bearing of a windscreen wiper system for a vehicle, said wiper bearing being rotatably arranged about a wiper shaft, is provided with gripping means which are assigned to the wiper bearing and which are able to be introduced through a through-recess provided therefore and which are able to be secured to a fastening region provided on the vehicle side, in particular a sheet metal body. The wiper bearing has a bearing element, which is configured in a planar manner on a first side and which is rotatable about the longitudinal axis, and a bearing section connected thereto, which are able to be rotated together coaxially around the wiper shaft. Gripping means are assigned to the bearing section and at least one engagement means is assigned to the bearing surface. The bearing section and the gripping means are able to be pushed through the through-recess and the engagement means and the gripping means are able to be secured by a rotational movement of the wiper bearing about the wiper shaft on the sheet metal body.

By these measures a fastening arrangement for a wiper bearing of the type specified in the introduction is provided, said fastening arrangement being of simple construction and being able to be fastened to a vehicle in a reliable manner and with low mounting effort by using as few tools as possible.

According to a further embodiment, the first side of the fastening region surrounding the through-recess is able to be brought into operative connection with the gripping means by the rotational movement of the wiper bearing about the wiper shaft. In this case, it is provided in this embodiment that the gripping means, the engagement means and the bearing surface are able to be rotated together about the wiper shaft. In this case, the gripping means and the engagement means engage behind the material of the sheet metal body surrounding the through-recess. Instead of the sheet metal body, a plurality of laminated and non-laminated plastics and/or composite materials may also be provided from modern vehicle construction as the material for a fastening region of the wiper bearing.

According to a further preferred embodiment, the through-recess arranged on the vehicle side is adapted in terms of shape to the contour of the gripping means and the bearing section. As a result, it is possible avoid material wastage on the vehicle side. Additionally, it is possible to achieve mounting of the wiper bearing in a manner which is as free of clearance as possible.

If the wiper bearing is rotated from its mounted position into its final position, the final position of the gripping means and the engagement means is also determined thereby. For improving the preferably exclusively mechanical connection, means increasing the friction between the bearing element and the sheet metal body may be specifically arranged on the end bearing region (fastening region) of the sheet metal body. For example, the friction of the friction partners may thus be additionally increased.

In a further particularly preferred embodiment of the present invention the engagement means is integrally formed parallel to the longitudinal axis on the bearing surface, for example with parallel surfaces. The engagement means in this case protrudes over the edge of the bearing surface. In this embodiment, the engagement means is effectively configured as a two-dimensional-quadrangular body, which on the edge of the bearing surface is integrally connected thereto. In this case, both the engagement means and the gripping means are arranged so as to be directionally oriented in the longitudinal direction of the bearing surface.

The engagement means is configured such that, with a rotational movement about the longitudinal axis, it is guided in the groove and when it reaches the final position it is able to be engaged in an engagement groove extending substantially transversely to the groove. The engagement means and the gripping means in this case are rotated together from the mounted position into the final position in which they connect the wiper bearing fixedly to the vehicle, both in the lateral direction and in the vertical direction.

The mounted position is defined as the position which is adopted when the gripping means is inserted into the through-recess and the first side of the bearing element of the wiper bearing bears against the upper face of the material of the sheet metal body surrounding the through-recess. The final position is defined as the position in which the engagement means is engaged in the engagement groove. The gripping means bear together against the lower face of the material of the sheet metal body surrounding the through-recess.

For example, the mounted position may be the zero degree position. Proceeding therefrom, in this exemplary embodiment, the final position is achieved with a ninety-degree rotation about the longitudinal axis. This corresponds to a quarter rotation on the area of a circle.

BRIEF DESCRIPTION OF THE DRAWINGS

Exemplary embodiments are described in more detail hereinafter with reference to the accompanying drawings. In the schematic figures.

DETAILED DESCRIPTION

Figure 1:
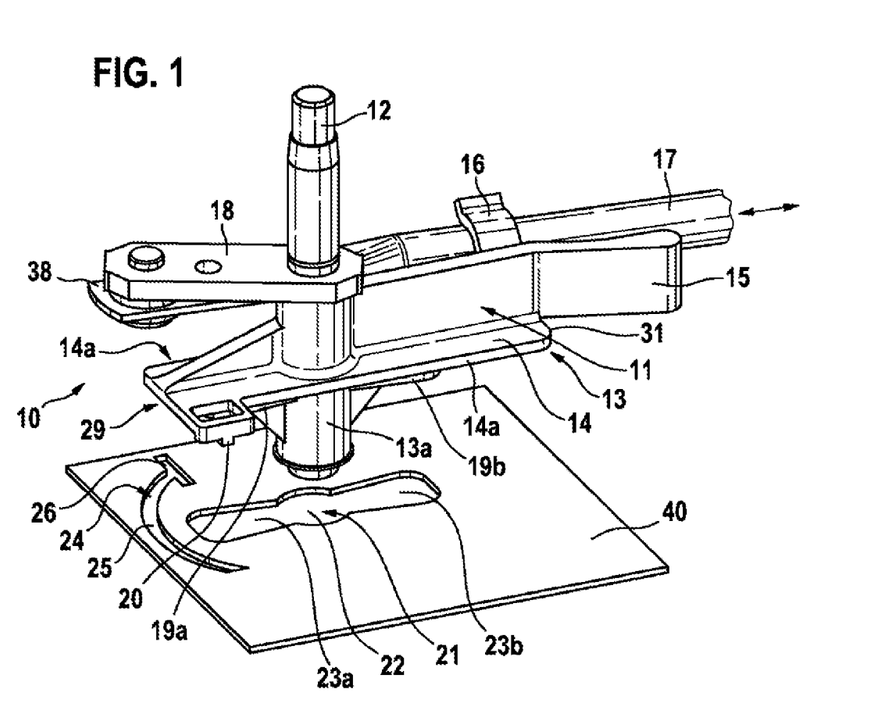
FIG. 1 shows a perspective view of the wiper bearing in the mounted position with a through-recess provided on the vehicle side, the wiper bearing with the assigned gripping means being able to be inserted therein.
Figure 2:
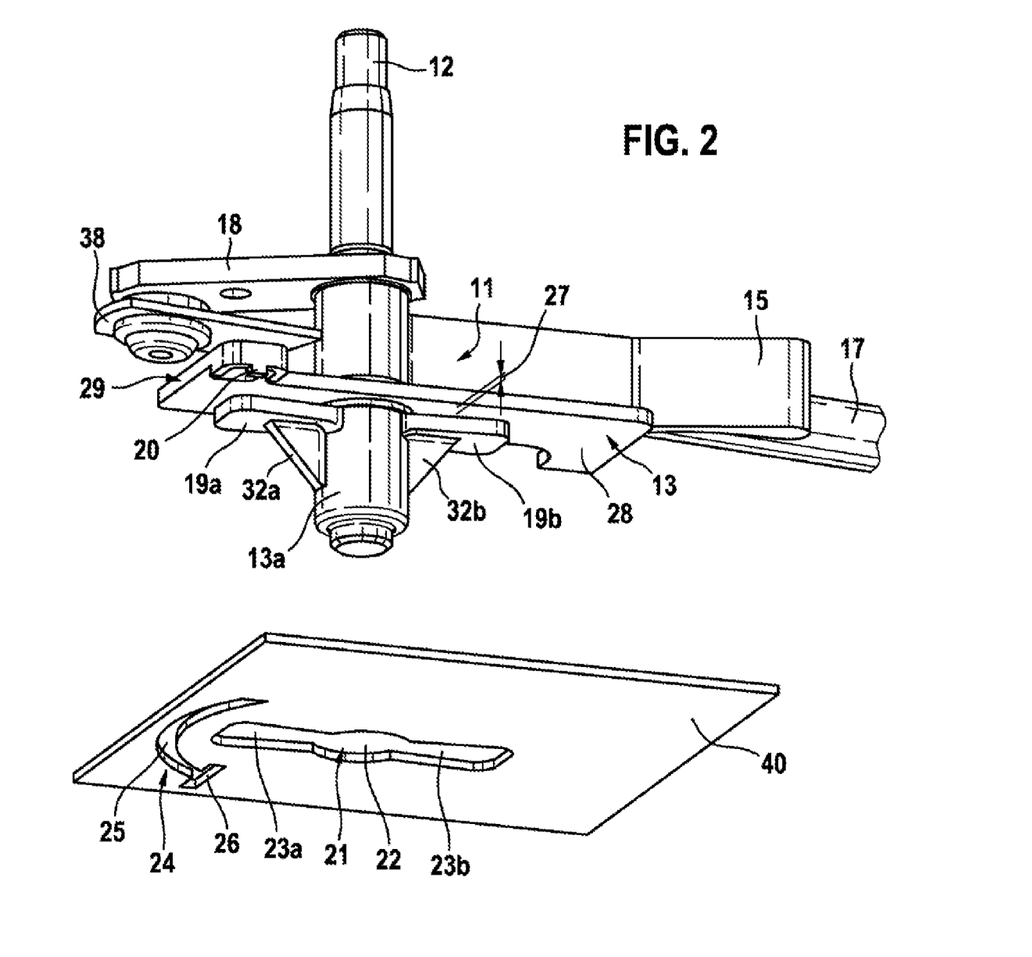
FIG. 2 shows a view of the wiper bearing in the mounted position corresponding to FIG. 1.

FIGS. 1 and 2 show different views of a fastening arrangement 10 for a wiper bearing 12 in a position immediately before mounting. The wiper bearing 11 is configured so as to be rotatable about a wiper shaft 12. The wiper shaft 12 serves, for example, for receiving wiper arms of a windscreen wiper system (not shown).

The wiper bearing 11 substantially comprises a planar bearing element 13 with a first side 28 having a bearing surface of planar configuration and a bearing section 13a. The bearing section 13a protrudes from the bearing element 13, substantially vertically from the first side 28, and is configured in the shape of a sleeve. The wiper shaft 12 is rotatably mounted in the sleeve-shaped bearing element 13. The bearing element 13 and the bearing section 13a may be fixedly connected together, for example by bonding or the like, or integrally configured.

The bearing element 13 may be provided with a fastening lever 15 which protrudes transversely from the bearing element 13, in particular vertically to the axial direction of the bearing section 13a. For example, the fastening lever 15 may be arranged on a second side 14 of the bearing element 13 opposing the first side 28, and protrude over an edge 31 of the bearing element 13.

For driving the wiper arm coupled to the wiper shaft 12, an articulated rod 17 is provided. The articulated rod 17 is operatively connected to the wiper shaft 12 via a coupling lever 18, so that a translational movement of the articulated rod 17 may be converted into a rotation of the wiper shaft 12.

The bearing section 13a is fixedly connected to the wiper bearing 11 and rotatable therewith coaxially about the longitudinal axis. The bearing section 13a serves as a bearing for the wiper shaft 12 so that the wiper bearing 11 is coaxially rotatable about the wiper shaft 12. The bearing section 13a also serves for guidance, for the insertion of the wiper bearing 11 into a through-recess 21 of a sheet metal body 40, the wiper bearing 12 being intended to be attached thereto. As a result, canting or jamming is prevented during mounting.

As shown in FIG. 2, on the bearing section 13a wing-like gripping means 19a, 19b are integrally formed or fastened thereto, wherein the gripping means 19a, 19b are able to be rotated together with the wiper bearing 11 coaxially about the wiper shaft 12. The wing-like gripping means 19a, 19b are arranged opposing one another in a linear manner on the bearing section 13a. The gripping means 19a, 19b are arranged with surfaces substantially parallel to the bearing surface of the bearing element 13.

The arrangement of the gripping means 19a, 19b is reinforced via respective reinforcing ribs 32a, 32b. The reinforcing ribs 32a, 32b are configured in order to reinforce the connection of the gripping means 19a, 19b to the bearing section 13*a* and in each case are arranged between the gripping means 19*a*, 19*b* and a portion of the bearing section 13*a* opposing the bearing element 13.

An engagement means 20 may be provided on the bearing element 13 or connected thereto. The engagement means 20 may, for example, protrude from the first side 28 of the bearing element in the axial direction, for example as a latching lug. For example, the engagement means 20 may be arranged on a region of the bearing element 13 which opposes the protruding direction of the fastening lever 15. Overall the engagement means 20 is arranged with a spacing from the bearing section 13*a* which is larger than the radial extent of the wing-like gripping means 19*a*, 19*b* from an axis of the bearing section 13*a*. The engagement means 20 may be integrally formed on the bearing element 13 or fastened thereto in a different manner.

On the vehicle side the sheet metal body 40 is provided with a guide recess 24 which has an arcuate curved groove 25 through the sheet metal body 40 which is continuous or discontinuous. When inserting the wiper bearing 11 into the through-recess 21 of the sheet metal body, the engagement means 20 comes into engagement with the groove 25, so that during a rotation of the wiper bearing 11 the engagement means 20 may be guided in the groove 25. The curvature of the arcuate groove 25 is determined by the spacing of the engagement means 20 toward the wiper shaft 12. The guide recess 24 also has an engagement groove 26 which is arranged at one end of the groove 25.

As shown in FIG. 2, the gripping means 19, 19*a* have a spacing 27 from the lower face 28 of the bearing element 13. The spacing 27 is selected such that it corresponds to the material thickness of the sheet metal body 40.

The sheet metal body 40 has a through-recess 21. The through-recess 21 has a central opening 22, two opposing wing-shaped opening portions 23*a*, 23*b* being adjoined thereto. The central opening 22 permits the receiving of the bearing section 13*a* and is correspondingly adapted thereto in its contour. The wing-shaped opening portions 23*a*, 23*b* adjoining the central opening 22 are slightly widened toward their end regions. The wing-shaped opening portions 23*a*, 23*b* permit the receiving of the wing-shaped gripping means 19*a*, 19*b* and are correspondingly adapted thereto in their contour, so that they are able to be passed through the opening portions 23*a*, 23*b*.

Figure 3:
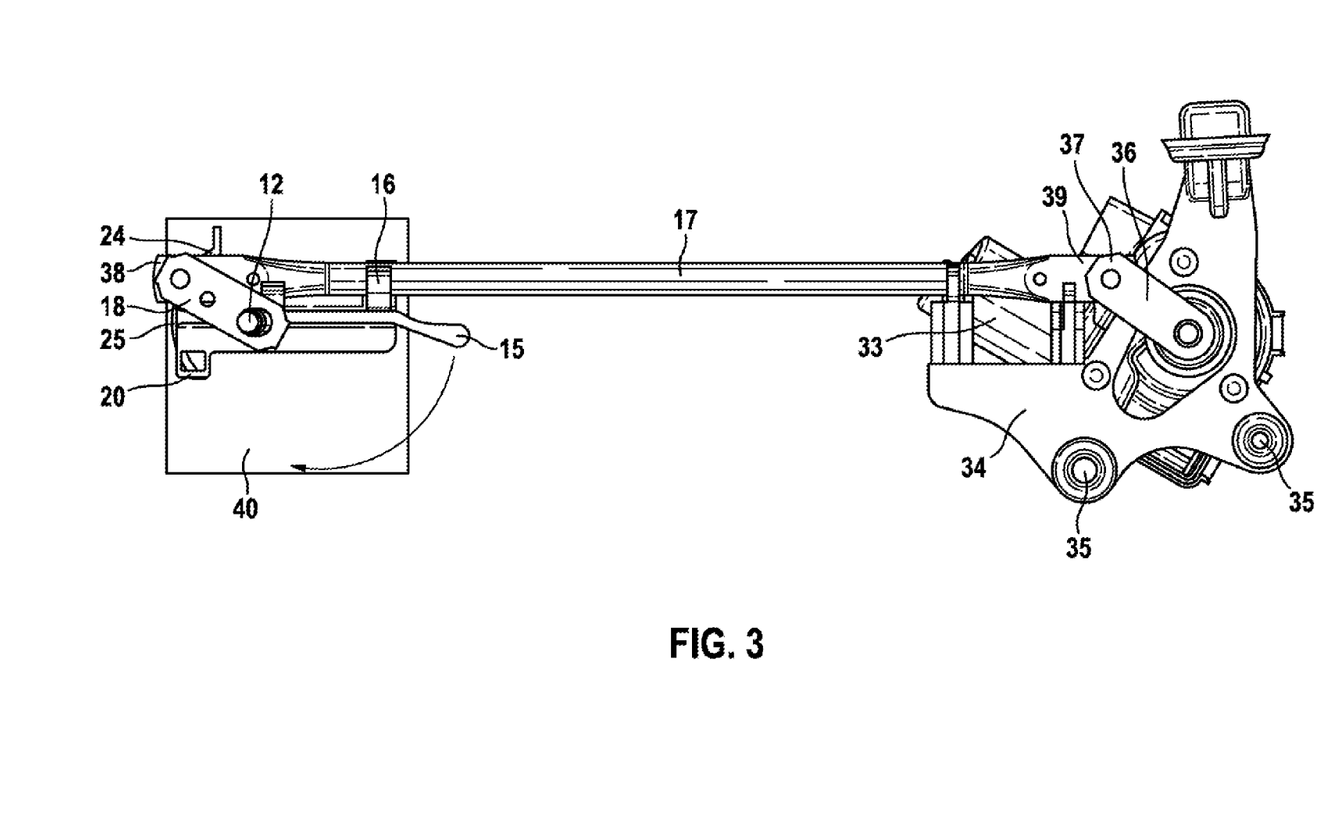
FIG. 3 shows a plan view in the installed position of the fastening arrangement of a wiper bearing in the mounted position, the gripping means being inserted in said mounted position into the through-recess provided on the vehicle side.

FIG. 3 shows a plan view in the installed position of the fastening arrangement according to the invention of a wiper bearing 11 in the mounted position, in which the gripping means 19*a*, 19*b* and engagement means 20 are inserted in the through-recess 21 and/or the guide recess 24 provided on the vehicle side in the sheet metal body 40.

Moreover, a drive unit 33, for example an electric motor, which is arranged on a carrier means 34 is shown. The carrier means 34 is provided with fastening points 35, the carrier means 34 being able to be fastened thereon to a body part of the vehicle (not shown), for example a further sheet metal body.

The drive unit 33 is connected to the articulated rod 17, via deflection means 36 on the first protruding end 37 thereof. The deflection means 36 convert the rotational movement of the drive unit 11 into a forward and rearward linear movement which is transmitted to the articulated rod 17. On a second end 38 opposing a first end 39, the articulated rod 17 is connected to the coupling lever 18. The coupling lever 18 is operatively connected to the wiper shaft 12 so that a linear movement of the articulated rod 17 is converted into a periodic rotational movement of the wiper shaft 12.

So that the wiper bearing 11 is retained for transport and/or before installation in the mounted position and is not intentionally rotated about the wiper shaft 12, a retaining element 16 is provided on the bearing element 13 or the fastening lever 15. The retaining element 16 in this case is arranged on the bearing surface of the bearing element 13 or the fastening lever 15 such that by means of the retaining element 16 the entire wiper bearing 11 is blocked in a mounted position on the articulated rod 17. The retaining element 16 may be configured, for example, as a resilient latching element. Thus it may protrude in a resilient arcuate manner from the fastening lever 15 in the direction of the articulated rod 17, and in the latched state the arcuate retaining element 16 is able to grip over the articulated rod 17 and retain the fastening lever and thus the bearing element 13 in a fixed position relative to the articulated rod 17.

In the mounted position the wing-like gripping means 19*a*, 19*b* oppose the wing-shaped opening portions 23*a*, 23*b* relative to the axial direction of the wiper shaft 12, so that with an axial displacement the wing-like gripping means 19, 19*a* are able to pass through the wing-shaped opening portions 23*a*, 23*b*.

Figure 4:
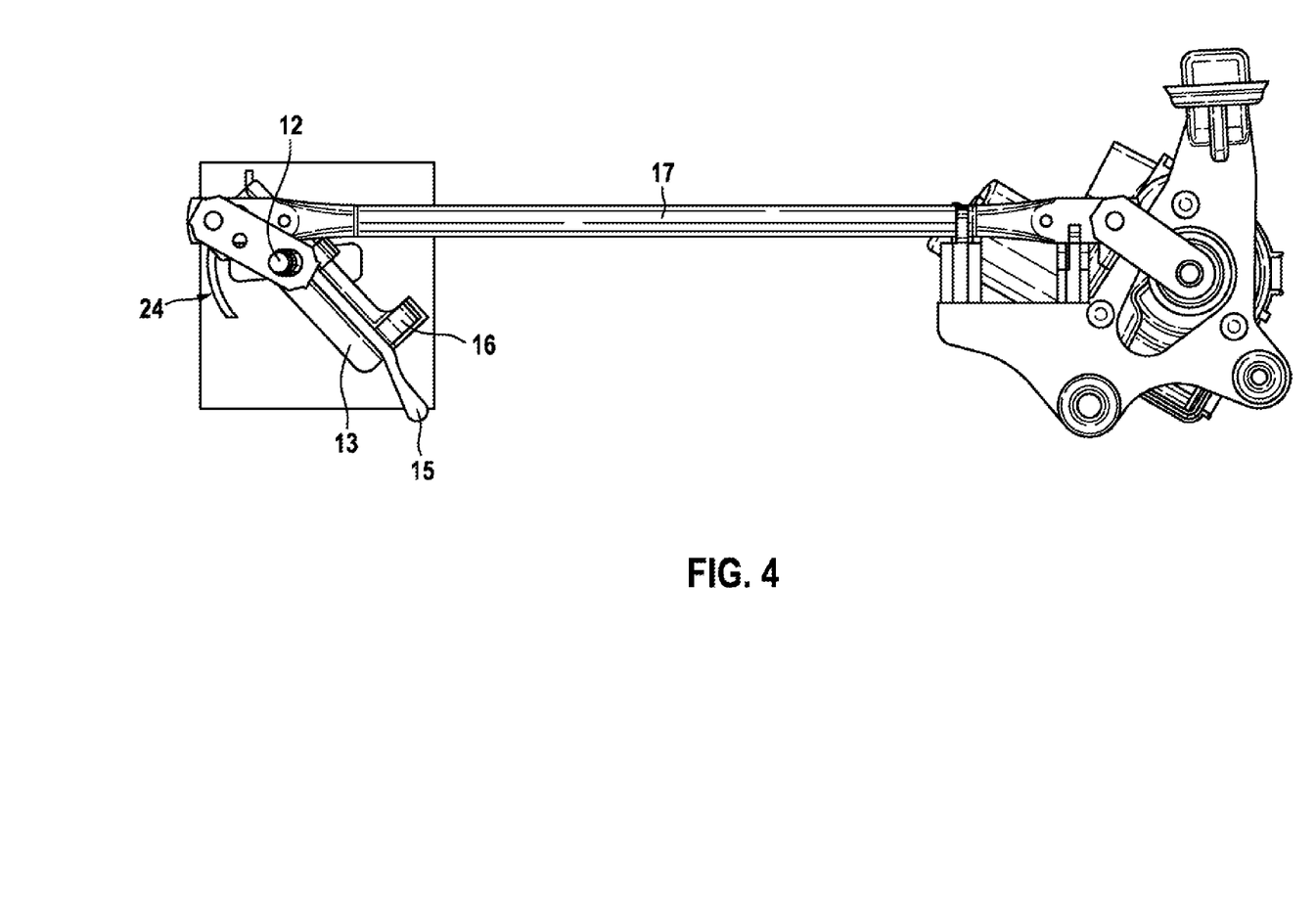
FIG. 4 shows a plan view similar to FIG. 3, wherein the wiper bearing is shown rotated from the mounted position into an intermediate position.
Figure 5:
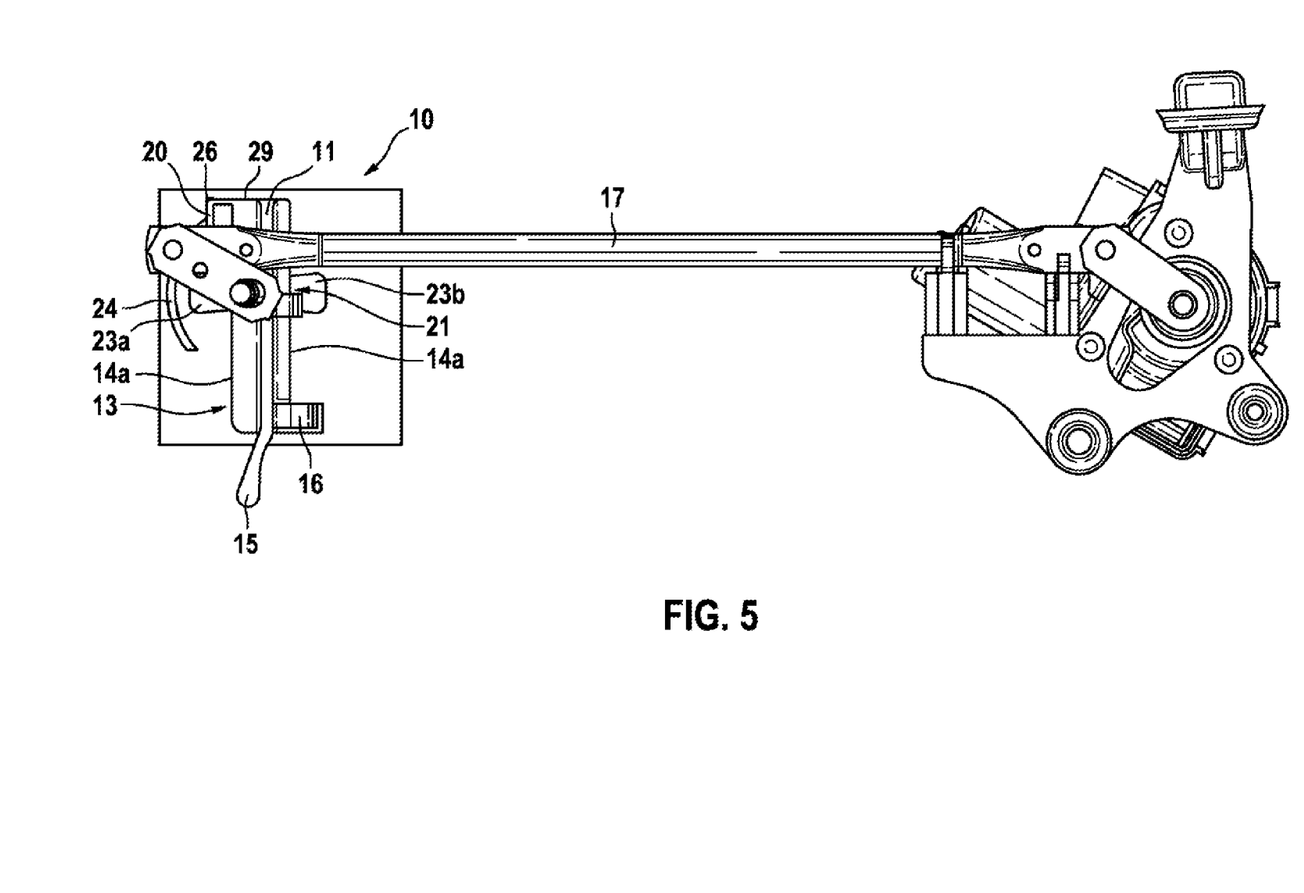
FIG. 5 shows also a plan view similar to FIG. 3, wherein the wiper bearing is shown in a final position rotated by 90° relative to the mounted position.

FIG. 3 and the subsequent FIG. 4 and FIG. 5 illustrate the sequence of movement for securing the wiper bearing 11 to a vehicle by means of a combined rotary and latched connection for the purpose of a bayonet closure.

The view of FIG. 3 shows a state after inserting the wiper bearing into the through-opening 21, so that the wing-like gripping means 19*a*, 19*b* pass through the wing-shaped opening portions 23*a*, 23*b* and the first side 28 of the bearing element 13 bears against the surface of the sheet metal body 40.

When actuating the fastening lever 15 the retaining element 16 is released from the articulated rod 17 and the wiper bearing 11 may be pivoted from the mounted position into an intermediate position according to FIG. 4 about the wiper shaft 12, as shown by the arrow in FIG. 3. In this case the wing-like gripping means 19*a*, 19*b* move or slide along the lower face 41 of the sheet metal body 40 opposing the bearing surface of the bearing section 13.

FIG. 5 shows the fastening arrangement 10 in a final position in which the wiper bearing 11 has been inserted in the through-recess 21 of the sheet metal body 40 and the guide recess 24 and is fixedly connected to the sheet metal body 40. In the final position the engagement means 20 is rotated relative to the mounted position, in particular by 90°, and latched to the engagement groove 26 of the sheet metal body 40. The engagement groove 26 may be arranged such that it extends parallel to the longitudinal direction 14*a* of the bearing surface 13 of the wiper bearing 11 in the final position. In particular, the engagement groove 26 is arranged such that the engagement means 20 latches therein, when the wing-like gripping means 19*a*, 19*b* after insertion in the through-opening 21 have been rotated by a predetermined angle, in particular by 90°, by the actuation of the fastening lever 15.

Figure 6:
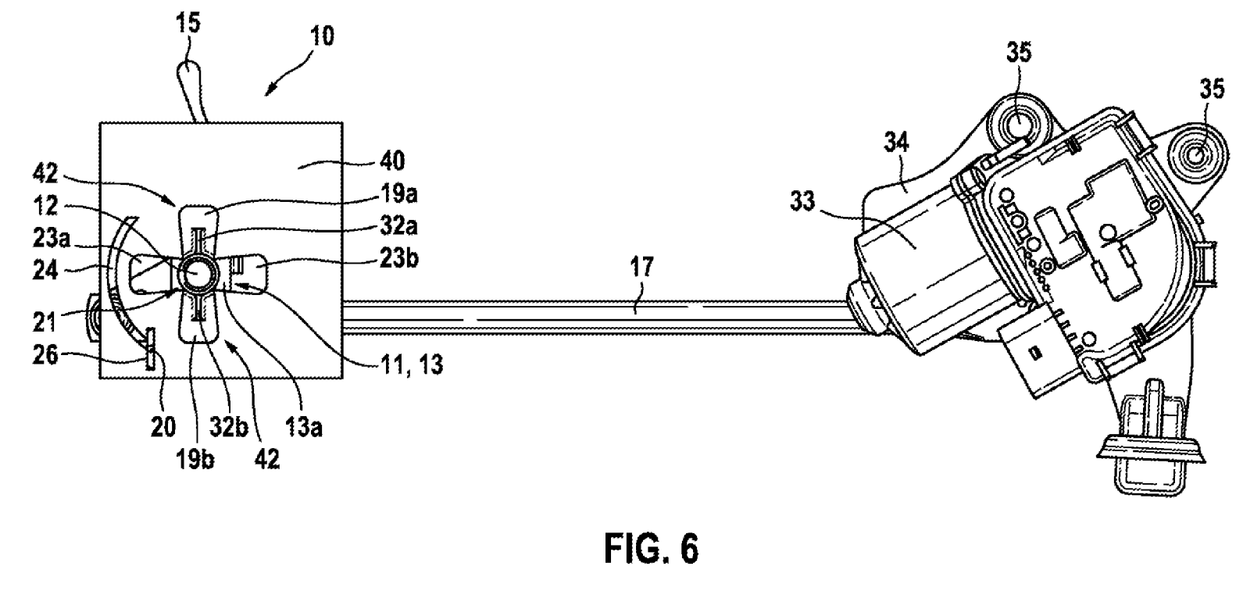
FIG. 6 shows a view similar to FIG. 3 in the installed position viewed from below, in the final position with the gripping and engagement means arranged on the wiper bearing, said gripping and engagement means together with the wiper bearing being shown rotated by 90° relative to the mounted position and connecting the wiper bearing to the vehicle.

FIG. 6 is a plan view of the wiper bearing 11 in the installed position, viewed from the direction of the sheet metal body 40 with the gripping means 19*a*, 19*b* in the final position. The bearing section 13*a* with the gripping means 19*a*, 19*b* and the engagement means 20 are inserted into the through-recess 21 and/or the guide recess 24.

The gripping means 19*a*, 19*b* form a bearing surface and by rotating the wiper bearing 11, in particular by 90°, said gripping means are brought into an operative connection with the lower face 41 of the sheet metal body 40. In this case the gripping means 19a, 19b engage behind the sheet metal body 40 and, as a result, form a non-positive connection. By the engagement of the engagement means 20 in the engagement groove 26 an undesirable movement of the wiper bearing 11 from the final position back into the mounted position is prevented.

As a result, a fastening arrangement 10 for a wiper bearing 11 is provided, by a rotation about the wiper shaft 12 the gripping means 19a, 19b being non-positively connected thereby to the fastening region 42 during mounting. By the simultaneous and/or subsequent engagement of the engagement means 20 into the engagement groove 26, when reaching the final position, the wiper bearing 11 is fixedly connected to the sheet metal body 40 in the lateral and vertical directions.

What is claimed is:

1. A fastening arrangement (10) comprising:
    a wiper bearing (11) of a windscreen wiper system of a vehicle, the wiper bearing (11) having
        a bearing element (13) having a planar first side (28);
        a bearing section (13a) which protrudes vertically from the first side (28) of the bearing element (13) for guiding a wiper shaft (12);
        one or more gripping means (19a, 19b) which are arranged on the bearing section (13a) and respectively comprise a gripping surface which is arranged parallel to a surface of the first side (28) of the bearing element (13), wherein the one or more gripping means (19a, 19b) are spaced from the first side (28) of the bearing element (13); and
        engagement means (20); and
    a fastening body (40) having a through-recess (21) with a contour, such that the one or more gripping means (19a, 19b) may be passed through the through-recess (21), and by rotating the one or more gripping means (19a, 19b) the fastening body (40) is retained between the one or more gripping means (19a, 19b) and the bearing element (13), the fastening body (40) further including a guide recess (24), wherein the engagement means (20) are configured to be received in the guide recess (24) when the one or more gripping means (19a, 19b) is passed through the through-recess (21).

2. The fastening arrangement (10) as claimed in claim 1, wherein the one or more gripping means (19a, 19b) has a spacing relative to the first side (28) of the bearing element (13) which substantially corresponds to a material thickness of the fastening body (40).

3. The fastening arrangement as claimed in claim 1, wherein the guide recess (24) is configured with a stop, such that after rotating the bearing section by a predetermined angle, further rotation is blocked.

4. The fastening arrangement (10) as claimed in claim 3, wherein the guide recess (24) is configured with an engagement groove (26) so that after rotating the bearing section by the predetermined angle the engagement means (20) is latched in the engagement groove (26) and, as a result, the bearing section (13a) is blocked from rotating back.

5. The fastening arrangement as claimed in claim 4, wherein the guide recess (24) comprises an arcuate groove (25), a radius thereof corresponding to a spacing between the engagement means (20) and the wiper shaft (12).

6. The fastening arrangement as claimed in claim 1, wherein the wiper bearing (11) is provided with a fastening lever (15), the wiper bearing (11) being able to be brought thereby from an initial mounted position into a final position.

7. The fastening arrangement as claimed in claim 6, characterized in that a retaining element (16) is arranged on the bearing element (13) or on the fastening lever (15), the wiper bearing (11) being able to be secured thereby to an articulated rod (17).

8. The fastening arrangement as claimed in claim 6, characterized in that a retaining element (16) is arranged on the bearing element (13) or on the fastening lever (15), the wiper bearing (11) being able to be secured thereby to an articulated rod (17) which is connected to a drive unit (33) for driving the wiper shaft (12).

9. The fastening arrangement as claimed in claim 1, wherein the guide recess (24) is configured with a stop, such that after rotating the bearing section by 90°, further rotation is blocked.

10. The fastening arrangement as claimed in claim 1, wherein the fastening body (40) is a sheet metal body.

11. A fastening arrangement (10) comprising a wiper bearing (11) of a windscreen wiper system of a vehicle, wherein the wiper bearing (11) comprises:
    a bearing element (13) having a planar first side (28);
    a bearing section which protrudes vertically from a first side (28) of the bearing element (13) for guiding a wiper shaft (12); and
    one or more gripping means (19a, 19b) which are arranged on the bearing section (13a) and respectively comprise a gripping surface which is arranged parallel to a surface of the first side (28) of the bearing element (13)
    wherein the wiper bearing (11) is provided with a fastening lever (15), the wiper bearing (11) being able to be brought thereby from an initial mounted position into a final position, and wherein a retaining element (16) is arranged on the bearing element (13) or on the fastening lever (15), the wiper bearing (11) being able to be secured thereby to an articulated rod (17).

12. The fastening arrangement of claim 11, wherein the articulated rod (17) is connected to a drive unit (33) for driving the wiper shaft (12).

13. The fastening arrangement of claim 11, wherein the retaining element (16) is arranged on the bearing element (13).

14. The fastening arrangement of claim 11, wherein the retaining element (16) is arranged on the fastening lever (15).

* * * * *